United States Patent
Schmitt et al.

(10) Patent No.: US 7,340,729 B2
(45) Date of Patent: Mar. 4, 2008

(54) REDUCING RECOMPILATION FREQUENCY

(75) Inventors: Andreas Simon Schmitt, Kaiserslautern (DE); Andreas Blumenthal, Heidelberg (DE); Helmut Prestel, Bad Schoenborn (DE); Frank Bertelsmeier, Speyer (DE)

(73) Assignee: SAP AG (DE)

( * ) Notice: Subject to any disclaimer, the term of this patent is extended or adjusted under 35 U.S.C. 154(b) by 643 days.

(21) Appl. No.: 10/695,635

(22) Filed: Oct. 28, 2003

(65) Prior Publication Data

US 2005/0091347 A1    Apr. 28, 2005

(51) Int. Cl.
G06F 9/45 (2006.01)
(52) U.S. Cl. .................. 717/145; 717/140; 717/156
(58) Field of Classification Search ............... 717/145, 717/140, 156
See application file for complete search history.

(56) References Cited

U.S. PATENT DOCUMENTS

| | | | |
|---|---|---|---|
| 4,558,413 A * | 12/1985 | Schmidt et al. | 707/203 |
| 5,854,932 A * | 12/1998 | Mariani et al. | 717/116 |
| 5,978,585 A * | 11/1999 | Crelier | 717/145 |
| 6,263,488 B1 * | 7/2001 | Fortin et al. | 717/127 |
| 6,298,319 B1 * | 10/2001 | Heile et al. | 703/26 |
| 6,298,477 B1 * | 10/2001 | Kessler | 717/145 |
| 6,308,320 B1 * | 10/2001 | Burch | 717/154 |
| 6,442,753 B1 * | 8/2002 | Gerard et al. | 717/170 |
| 6,799,320 B1 * | 9/2004 | Elvanoglu et al. | 719/331 |
| 6,820,253 B1 * | 11/2004 | Robison | 717/141 |
| 6,857,119 B1 * | 2/2005 | Desai | 717/145 |
| 6,973,646 B1 * | 12/2005 | Bordawekar et al. | 717/146 |
| 6,976,249 B1 * | 12/2005 | Stattenfield | 717/149 |
| 6,983,457 B2 * | 1/2006 | Mitsumori et al. | 717/145 |
| 6,986,128 B2 * | 1/2006 | Linden | 717/140 |

OTHER PUBLICATIONS

Incremental Compilation in Magpie, Mayer D. Schwartz et al, ACM, 1984, pp. 122-131.*
An Approach to Incremental Compilation, Steven P. Reiss, ACM, 1984, pp. 144-156.*
An Incremental Constraint Solver, Bjorn N. Freeman-Benson et al, ACM, 1990, pp. 54-62.*
Principles of Object-Oriented Analysis and Design, James Martin, Jun. 1, 1992, pp. 269, 315.*
Herold, Helmut. "make- Das Profitool zur automatischen Generierung von Programmen", pp. 37-56, Addison-Wesley, Munich, Mar. 15, 2003, XP0002378407, in German.
Retrieved from the Internet: URL:http://www.pear-forum.de/amazond_382732095X.html> [retrieved on Apr. 24, 2006]—Proves publication date of document XP002378407, in German.
Stallman R M et al.; "GNU Make—A program for Directing Recompilation- Version 3.77—Chapters 1-8". GSF, May 1998 XP002158175, Section 2.2, p. 4.

* cited by examiner

*Primary Examiner*—Todd Ingberg
(74) *Attorney, Agent, or Firm*—Fountainhead Law Group P.C.

(57) ABSTRACT

An article of manufacture and a method includes providing a system having an interface, dividing the interface into levels, associating a dependency list with a level, associating a client with the dependency list, and marking the clients associated with a dependency list for recompilation based on a change to a global component.

23 Claims, 4 Drawing Sheets

REDUCING RECOMPILATION FREQUENCY

TECHNICAL FIELD

This invention relates to reducing compilation frequency.

BACKGROUND

In a software system including several compilation units, there are multiple relations between the units. One unit can depend on information included in another unit. For example, a unit can depend on a global component. To avoid inconsistencies, the unit is recompiled when a change is made to the global component.

SUMMARY

In one aspect the invention features an article of manufacture and a method that includes providing a system having an interface, dividing the interface into levels, associating a dependency list with a level, associating a client with the dependency list, and marking the clients associated with a dependency list for recompilation based on a change to a global component.

Embodiments can include one or more of the following. The interface can include a definition unit. The method can include recompiling the client automatically based on the marking. Recompiling the client can occur at a subsequent usage. The subsequent usage may be a next usage. Determining recompilation for a client based on the definition unit can include determining if a property associated with the level has changed, and marking the client for recompilation only if a property has changed. Dividing the interface into levels may include assigning an arbitrary number of levels to the interface and/or assigning a level based on a dependency on all levels of the interface. A client assigned to the level based on a strong dependency on the whole interface can be recompiled after each change to the interface. Dividing the interface into levels can include assigning a level based on a dependency on an interface component. A client assigned to the level based on a dependency on an interface component can be recompiled after each change to the component. The change to the component can be a name change, a deletion of a component, or a layout change. Dividing the interface into levels can include assigning a level based on a reference to the interface. The client may depend on the existence of the interface. Indirect clients may be associated with a level. This level may be a lower level than the clients. The dependency list can be automatically managed by the system.

The system provides an advantage of reducing a total number of clients marked for recompilation based on a single change to a global component. Reducing the number of clients for recompilation can increase the performance of a system by reducing the time spent for recompilation.

Automatically recompiling a client on a next usage of the client ensures that the client is up-to-date and that there is no inconsistency between the global component and the client due to a change made in the global component.

The system allows a user to divide an interface into appropriate interface levels. This allows customization of the system to accommodate the needs of a diverse type of systems. In addition, allowing a designer of a recompilation system to determine an appropriate interface level with which to associate each client and indirect client provides an advantage of only re-compiling clients and indirect clients that are affected or have a high probability of being affected by a change in a global component associated with the interface level.

In a development system, many users work on a shared system. The shared system provides an advantage of added consistency between the users by providing up-to-date information to each user (by a recompilation) in response to a change made to a global component. This can reduce a total development time and increase a performance of the development system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
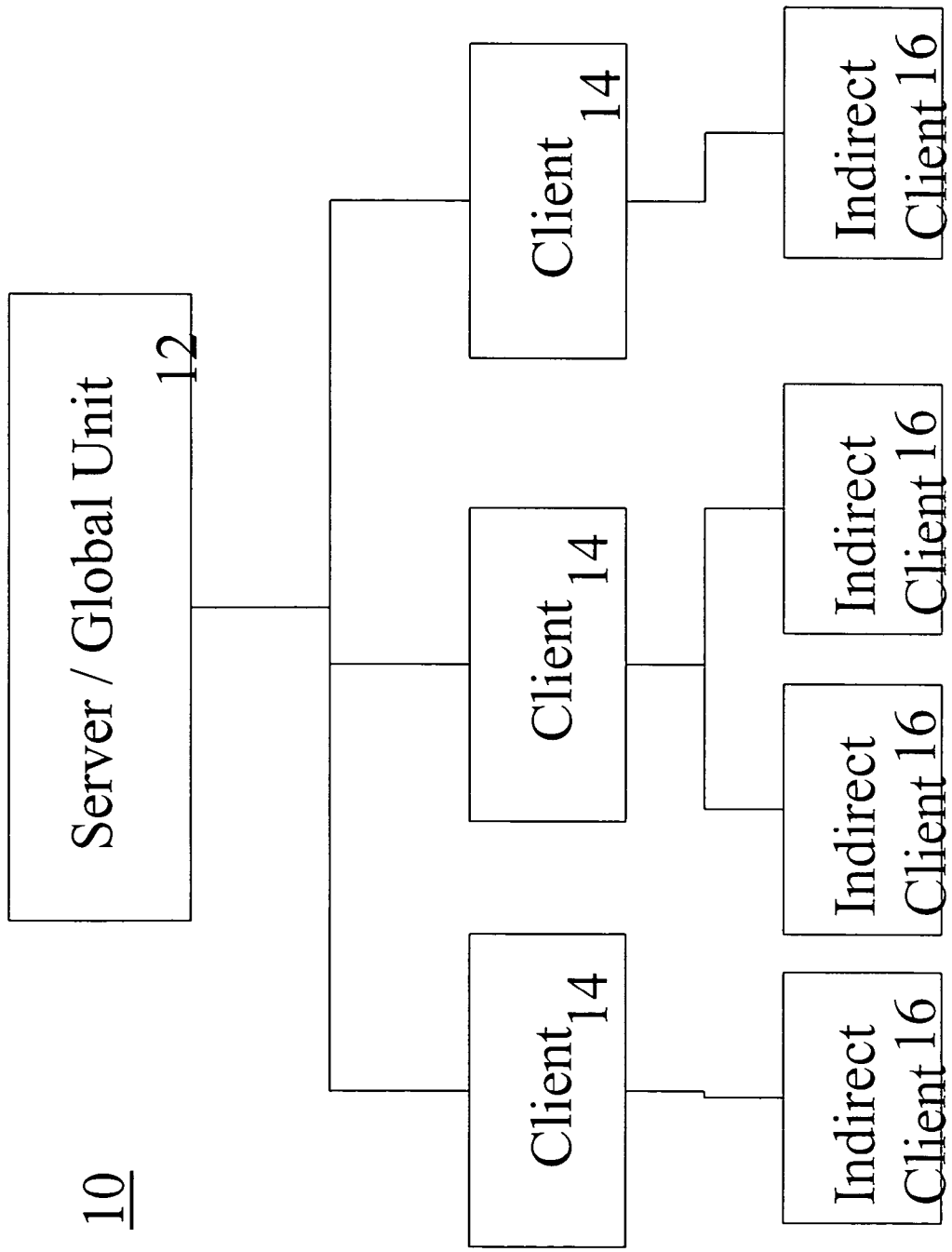
FIG. 1 is a block diagram of a system hierarchy.

As shown in FIG. 1, an exemplary software system 10 includes a global unit 12 (e.g., a server), clients 14, and indirect clients 16 (i.e. clients of clients). Each client 14 depends on information (e.g. a global component) included in the global unit 12. Similarly, each indirect client 16 depends on information included in the client 12. To avoid inconsistencies with respect to the global component among the global unit 10, clients 14, and indirect clients 16, the system 10 marks a client 14 and/or indirect client 16 for recompilation after a change associated with an interface (not shown) on which the client 14 or indirect client 16 depends. The interface can include a set of statements, functions, options, data, and program instructions included in the system 10 and accessed by a client 14 or indirect client 16. Another client 14 or indirect client 16 can rely on a portion or all of the information included in the interface. Since the client 14 or indirect client 16 uses only a portion of the interface, the client 14 or indirect client 16 recompiles in response to a change to the global component associated with the interface 30. During recompilation, the system 10 updates the client 14 or indirect client 16 to reflect the changes made to the global component in the global unit 12. Recompilation ensures that the client 14 or indirect client 16 is up-to-date so inconsistencies do not arise between the global unit 12 and the client 14 or indirect client 16 due to the change made to the global component in the global unit 12.

In this example, the system 10 includes two levels of hierarchy, i.e., clients 14 and indirect clients 16. The system 10 can also include additional levels of dependency wherein the indirect clients 16 have clients. The number of levels of dependency is arbitrary and is determined at design time based on a desired layout of the system 10. Global unit 12 can be a server in a network configuration such that the clients 14 are separate computer systems. The global unit 12 can be a global piece of software within the system 10 and the clients 14 are other units of software that depend on this global piece.

Figure 2:
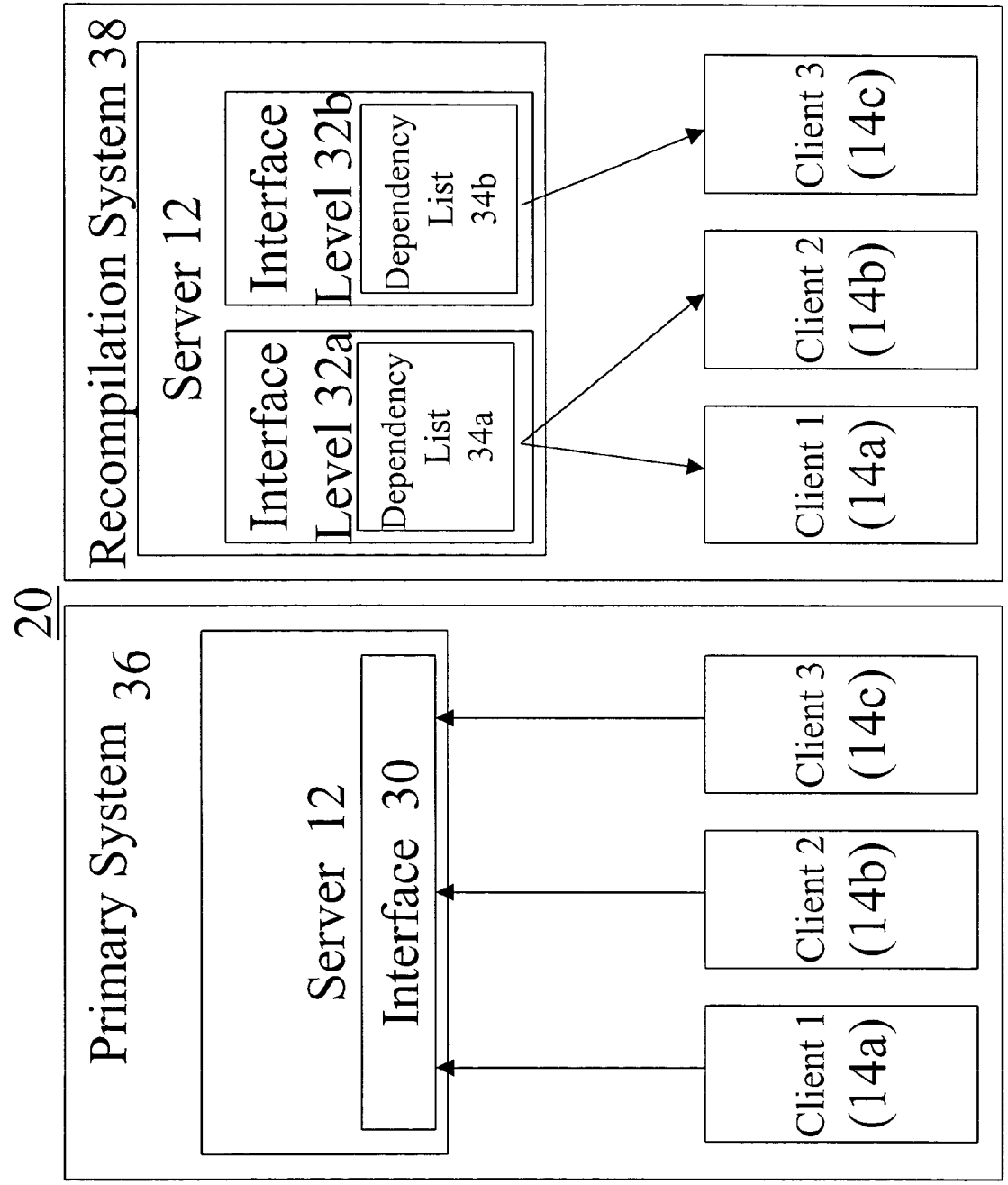
FIG. 2 is a block diagram of the primary system and recompilation system

As shown in FIG. 2, a system 20 is divided into a primary system 36 and a recompilation system 38. Users manage the primary system 36. Recompilation system 38 monitors all relations in the primary system 36 and builds a representation parallel to the representation in the primary system 36. This representation includes interface levels 32 and dependency lists 34. Primary system 36 includes an interface 30. The interface 30 includes information in the global unit 12 that is referenced by a client 14 or indirect client 16. In this example, clients 14a, 14b, and 14c all depend on information included in interface 30. This information can include global components, the definition of attributes, and signatures of methods. A designer of the recompilation system 38 generates interface levels 32 (included in the recompilation system 38) during design time. Each interface level 32 corresponds to a subset of the global unit 12 and includes a dependency list 34. Each dependency list 34 includes associations to a list of clients 14 and indirect clients 16. The recompilation system 38 automatically determines the appropriate list for each client such that a representation of the client interface included in primary system 36 is generated in the recompilation system 38. For example, as shown in FIG. 2, clients 14a and 14b are associated with dependency list 34a while client 14c is associated with dependency list 34b. The system 10 uses the dependency list 34 to determine clients 14 and indirect clients 16 to mark for recompilation if a change is made to a global component on which the indirect client 16 depends.

Clients 14 and indirect clients 16 are included in the dependency list 34 based on information they access or reference within interface level 30. For example, clients can be included in a dependency list based on reference type (e.g., weak or strong). A weak reference is a reference to only the name of an interface. A strong reference is a reference to the name of the interface and one of the interface components. A user of system 10 defines the relations between components in the primary system 36, and recompilation system 38 determines an appropriate dependency list 34 with which to associate the client. Thus, the client 14 and/or indirect client 16 is marked for recompilation based on the dependency list 34 and the client 14 or indirect client 16 is recompiled only if the changes to a global component in global unit 12 includes changes relevant to the client 14 or indirect client 16.

For example, if a user of the primary system 36 desires to add another client, "client 4", the user defines the relationships between the client and components of the interface. When "client 4" is added, the recompilation system 38 will generate a parallel representation of the interface dependencies by associating the client with a particular interface list. When a change is made to the interface 30 in the primary system 36, the recompilation associates the change with a particular interface level. If the client is included on the dependency list 34 for the interface level 32 associated with the change, the client will be marked for recompilation by recompilation system 38.

Although FIG. 2 shows only two interface levels 32, the global unit 12 can be divided into an arbitrary number of interface levels 32 at the time of design of the recompilation system 38. An increase in a number of interface levels 32 can reduce a total number of clients 14 and indirect clients 16 marked for recompilation for a single change to a global component. An increase in the number of interface levels 32 can increase an implementation effort of a designer during design of the recompilation system, but does not increase the implementation effort of a user during run-time. The implementation effort of the user during run-time is not increased because the user defines relations between the components regardless of the number of levels. At run-time, the recompilation system 38 automatically determines the appropriate dependency list 34. During run-time of the recompilation system 38, the interface levels 32 can no longer be changed. Run-time is the time when the system 10 is developed and changed by a number of users of the system 10.

In one example, a distinction between interface levels 32 depends on whether the client 14 or indirect client 16 includes a reference to a specific component of an interface or to the interface itself, but not to a component. An example of a component is a class. External attributes and signatures of external methods build up a class interface. The implementations of all methods, also of the external methods, are a non-interface (implementation) part of the class. There is no direct access to the non-interface part of any component. Upon alteration of a component within the interface, for example, a component is deleted or renamed, only clients depending on the components of the interface are marked for recompilation. This can reduce a total number of clients 14 and indirect clients 16 marked for recompilation.

In another example, the interface includes distinctions between clients 14 and indirect clients 16. Since many indirect clients 16 have only weak references, assigning the indirect clients 16 to a separate interface level from the clients 14 can be beneficial. The interface level 32 associated with indirect clients 16 having weak references can be recompiled less frequently than a level including clients 14. In a similar manner, the interface also includes interface levels 32 associated with clients of the indirect clients 16, and so forth.

In another example, all interface levels 32 include references to particular information in the system 10. For example, all clients 14 and indirect clients 16 can depend on an existence of a common variable X. Thus, if a user renames variable X to be variable Y, all clients 14 and indirect clients 16 need to be recompiled. Thus, if a change affects all interface levels 32, all clients 14 and indirect clients 16 can be marked for recompilation simultaneously.

In another example, the global unit 12 includes three interface levels. A first level includes clients 14 and indirect clients 16 with a strong dependency on the interface. This level incorporates layout information of the interface 30 and the system 10 marks a client 14 or indirect client 16 for recompilation after every change in the interface. A second interface level includes clients 14 and indirect clients 16 with a strong dependency on an interface component (e.g. a reference to name of a component interface and one of the interface components). This interface level is associated with layout information for the component and the system 10 marks a client 14 or indirect client 16 for recompilation only if the component is changed. For example, if the name of the component changes, the component is deleted, or the layout of the component changes. A third interface level includes clients with a reference to the interface itself, but not to a component (i.e. a weak reference). The client depends only on the existence of the interface and the system 10 marks the client for recompilation only if the interface itself is changed.

Figure 3:
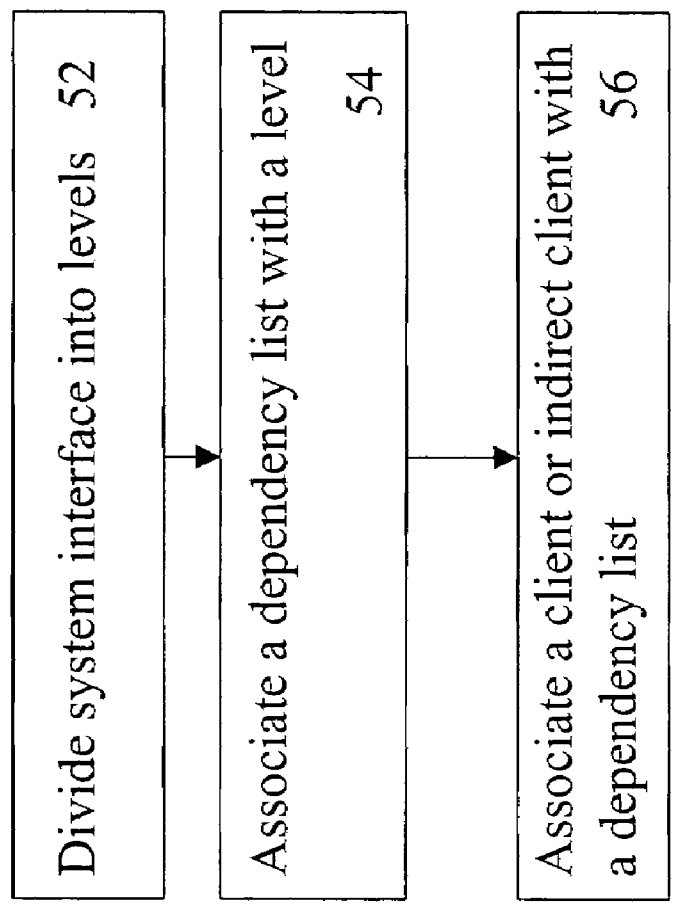
FIG. 3 is a flow diagram of a process associated with the design of the recompilation system.

As shown in FIG. 3, a process 50 associated with a design of the recompilation system 38 includes dividing (52) an interface 30 into levels 32. A designer of the recompilation system 38 determines the levels 32. Process 50 associates (54) a dependency list 34 with an interface level 32. Process 50 associates (56) a client 14 and indirect client 16 with a dependency list at run-time based on rules defined by the designer of the recompilation system 38 and relations between the components defined by the user.

Figure 4:
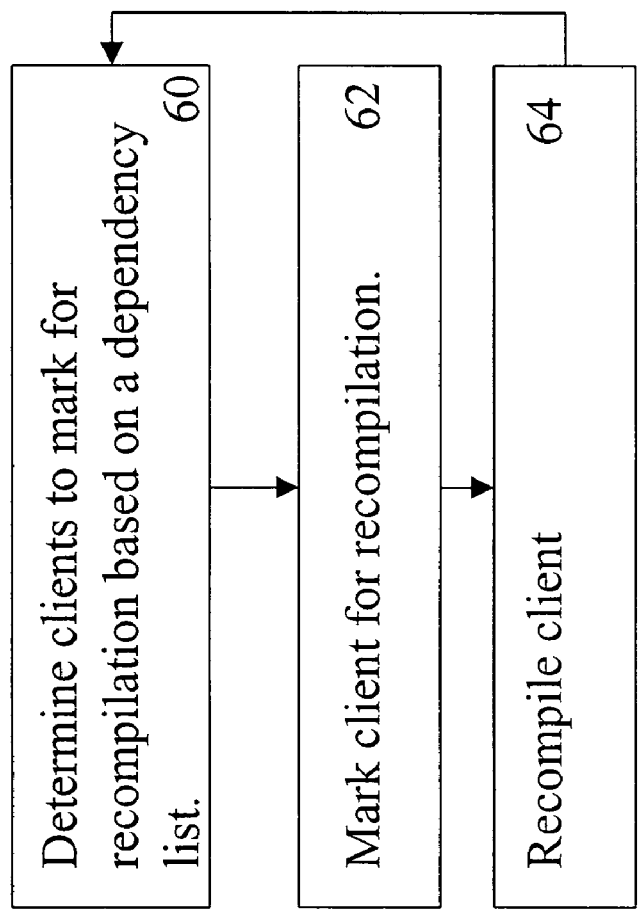
FIG. 4 is a flow diagram of a process of the recompilation system during run-time.

As shown in FIG. 4, a process 58 shows a recompilation process of the system at run-time. Process 58 determines (60) clients 14 and indirect clients 16 to mark for recompilation in response to a change to a global component. Determination (60) is based on the dependency list associated with the client 14. In response to the determination (60), process 50 marks (62) a client for recompilation and automatically recompiles (64) the client based on the marking. Process 58 can include repeating determining (60), marking (62), and recompiling (64) for a subsequent change made to a global component.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims.

What is claimed is:

1. A method comprising:
    providing a system including an interface and multiple clients, wherein every client comprises code that, in being compiled, depends on information included in the interface;
    defining two or more levels for the interface, the two or more interface levels being defined at design time, each level corresponding to a subset of the information included in the interface;
    generating two or more dependency lists for the interface, wherein each dependency list corresponds to a distinct one of the interface levels;
    associating each client with a particular dependency list based on the information in the interface that the client depends on;
    changing the interface and associating the change with a particular interface level and a corresponding dependency list; and
    using the corresponding dependency list to mark clients for recompilation, wherein only those clients associated with the particular interface level by the corresponding dependency list are marked for recompilation.

2. The method of claim 1 further comprising recompiling the client automatically based on the marking.

3. The method of claim 2 wherein recompiling the client occurs at a subsequent usage.

4. The method of claim 3 wherein the subsequent usage is a next usage.

5. The method of claim 1 wherein marking only those client associated with the particular interface level by the corresponding dependency list further comprises:
    determining if a particular property associated with the level has changed; and
    marking the client for recompilation only if a particular property has changed.

6. The method of claim 1 wherein dividing the interface into levels further comprises assigning an arbitrary number of levels to the interface.

7. The method of claim 1 wherein dividing the interface into levels includes assigning a level based on a dependency on all levels of the interface.

8. The method of claim 7 further comprising recompiling a client assigned to the level based on a strong dependency on the whole interface after each change to the interface.

9. The method of claim 1 wherein dividing the interface into levels further comprises assigning a level based on a dependency on an interface component.

10. The method of claim 9 further comprising, recompiling a client assigned to the level based on a dependency on an interface component after each change to the component.

11. The method of claim 10 wherein the change to the component includes a name change.

12. The method of claim 10 wherein the change to the component includes a deletion of a component.

13. The method of claim 10 wherein the change to the component includes a layout change.

14. The method of claim 1 wherein dividing the interface into levels includes assigning a level based on a reference to the interface.

15. The method of claim 14 wherein the client depends on the existence of the interface.

16. The method of claim 1 further comprising associating indirect clients with a level.

17. The method of claim 16 wherein the indirect clients are associated with a lower level than the clients.

18. The method of claim 1 wherein the dependency list is automatically managed by the system.

19. A computer program product, tangibly embodied in a machine-readable storage device, the computer program product being operable to cause a machine to:
provide a system including an interface and multiple clients, wherein every client comprises code that, in being completed, depends on information included in the interface;
define two or more levels for the interface, the two or more interface levels being defined at design time, each level corresponding to a subset of the information included in the interface;
generate two or more dependency lists for the interface, wherein each dependency list corresponds to a distinct one of the interface levels;
associate each client with a particular dependency list based on the information in the interface that the client depends on;
change the interface and associate the change with a particular interface level and a corresponding dependency list; and
use the corresponding dependency list to mark clients for recompilation, wherein only those clients associated with the particular interface level by the corresponding dependency list are marked for recompilation.

20. The computer program product of claim 19 further comprising, instructions to cause a machine to recompile the client automatically based on the marking.

21. A system comprising:
a primary system including an interface and multiple clients, wherein every client comprises code that, in being completed, depends on information included in the interface;
a recompilation system including a processor and a memory storing a computer program product that includes instructions operable to cause the processor to:
define two or more levels for the interface, the two or more interface levels being defined at design time, each level corresponding to a subset of the information included in the interface;
generate two or more dependency lists for the interface, wherein each dependency list corresponds to a distinct one of the interface levels;
associate each client with a particular dependency list based on the information in the interface that the client depends on;
change the interface and associate the change with a particular interface level and a corresponding dependency list; and
use the corresponding dependency list to mark clients for recompilation, wherein only those clients associated with the particular interface level by the corresponding dependency list are marked for recompilation.

22. The system of claim 21 in which the computer program product stored in the memory of the recompilation system further includes instructions operable to cause the processor of the recompilation system to automatically recompile only those clients that are marked.

23. The system of claim 21 in which the computer program product stored in the memory of the recompilation system further includes instructions operable to cause the processor of the recompilation system to:
determine if a property associated with the level has changed, and
mark the client for recompilation only if a property has changed.

* * * * *